US012143969B2

United States Patent
Vagner et al.

(10) Patent No.: US 12,143,969 B2
(45) Date of Patent: Nov. 12, 2024

(54) COMPACT DATA AND REFERENCE SIGNAL REPRESENTATION WITH MODULATION COMPRESSION

(71) Applicant: QUALCOMM Incorporated, San Diego, CA (US)

(72) Inventors: Shmuel Vagner, Raanana (IL); Michael Francis Garyantes, Bradley Beach, NJ (US); Senthilkumar Sundaram, San Diego, CA (US); Abhishek Saurabh Sachidanand Sinha, Malm (SE); Shingyu Kwak, San Diego, CA (US); Deepak Agarwal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 386 days.

(21) Appl. No.: 17/492,545

(22) Filed: Oct. 1, 2021

(65) Prior Publication Data

US 2023/0105918 A1 Apr. 6, 2023

(51) Int. Cl.
*H04W 72/044* (2023.01)
*H04L 5/00* (2006.01)

(52) U.S. Cl.
CPC ......... *H04W 72/044* (2013.01); *H04L 5/0048* (2013.01)

(58) Field of Classification Search
CPC ........... H04W 72/044; H04W 28/0231; H04W 28/18; H04W 52/16; H04L 5/0048; H04L 5/14; H04L 27/2602; H04L 27/2634; H04L 5/0032; H04L 5/0044; H04L 25/03343; H04L 5/0053; H04L 27/0008; H03M 7/40
See application file for complete search history.

(56) References Cited

U.S. PATENT DOCUMENTS

| 10,541,739 B1* | 1/2020 | Nammi ............. H04L 25/03343 |
| 2017/0238361 A1* | 8/2017 | Pawar ..................... H03M 7/40 |
| | | 455/561 |

(Continued)

FOREIGN PATENT DOCUMENTS

| KR | 102633030 B1 * | 2/2024 | |
| WO | WO-2014076004 A2 * | 5/2014 | ....... H04B 10/25758 |
| WO | 2019217391 A1 | 11/2019 | |

OTHER PUBLICATIONS

A. Vosoughi, M. Wu and J. R. Cavallaro, "Baseband signal compression in wireless base stations," in Proc. IEEE Global Communications Conference, pp. 4505-4511, Dec. 2012 (Year: 2012).*
J. Lorca and L. Cucala, "Lossless compression technique for the fronthaul of LTE/LTE-advanced Cloud-RAN architectures," in World of Wireless, Mobile and Multimedia Networks (WoWMoM), 2013 IEEE 14th International Symposium and Workshops on a, Jun. 2013, pp. 1-9 (Year: 2013).*

(Continued)

*Primary Examiner* — Ayaz R Sheikh
*Assistant Examiner* — Louis Samara
(74) *Attorney, Agent, or Firm* — Patterson & Sheridan LLP

(57) ABSTRACT

Certain aspects of the present disclosure provide techniques for wireless communication by a first network entity. The techniques may generally involve generating a message having a section with entries that represent time and frequency resources for transmitting data and reference signals over a fronthaul interface using modulation compression, transmitting the message to a second network entity via the fronthaul interface, and processing data and reference signal transmissions on the fronthaul interface in accordance with the section.

30 Claims, 13 Drawing Sheets

(56) References Cited

U.S. PATENT DOCUMENTS

| | | | |
|---|---|---|---|
| 2019/0208575 A1* | 7/2019 | Barbieri | H04W 80/02 |
| 2019/0254047 A1* | 8/2019 | Ahmed | H04W 88/085 |
| 2019/0273641 A1* | 9/2019 | Cavalcante | H04L 27/0008 |
| 2020/0128496 A1* | 4/2020 | Rama Chandran | H04W 52/16 |
| 2020/0235788 A1* | 7/2020 | Rajagopal | H04B 7/0848 |
| 2021/0058925 A1* | 2/2021 | Shim | H04L 5/0053 |
| 2021/0120531 A1* | 4/2021 | Jeon | H04B 7/0695 |
| 2021/0135722 A1 | 5/2021 | Ahmed et al. | |
| 2021/0195462 A1* | 6/2021 | Pezeshki | H04W 72/23 |
| 2022/0078631 A1* | 3/2022 | Salahuddeen | H04L 45/16 |
| 2022/0240187 A1* | 7/2022 | Guo | H04W 52/0229 |
| 2022/0377707 A1* | 11/2022 | Guo | H04L 5/0053 |
| 2023/0014537 A1* | 1/2023 | Berg | H04L 5/0051 |
| 2024/0080154 A1 | 3/2024 | Vagner et al. | |

OTHER PUBLICATIONS

Partial International Search Report—PCT/US2022/038874—ISA/EPO—Dec. 21, 2022.
International Search Report and Written Opinion—PCT/US2022/038874—ISA/EPO—Mar. 13, 2023.
O-Ran Fronthaul Working Group: "Control, User and Synchronization Plane Specification", Technical Specification—O-Ran.WG4.CUS.0-v03.00—O-RAN FRonthaul Working Group: Control, User and Synchronization Plane Specification, O-RAN, vol. O-RAN.WG4.CUS.0-v03.00, Apr. 1, 2020, pp. 1-253, XP009530675, sections 5.4.5.9, 5.4.7.1.1, 5.4.7.1.2, 5.4.7.4, 5.4.7.4.2, 5.4.7.5, 5.4.7.10.1, 5.4.7.11, 5.4.7.11.1, 5.4.7.11.2, 6.3.3.13, 8.1, 10.4.

* cited by examiner

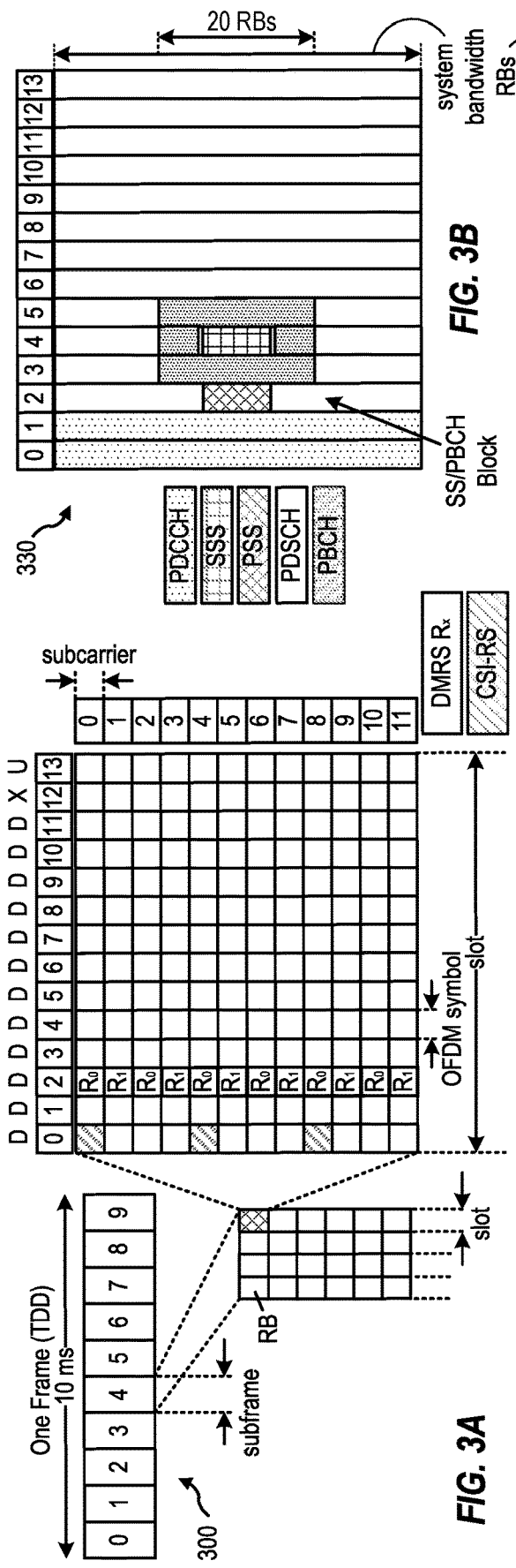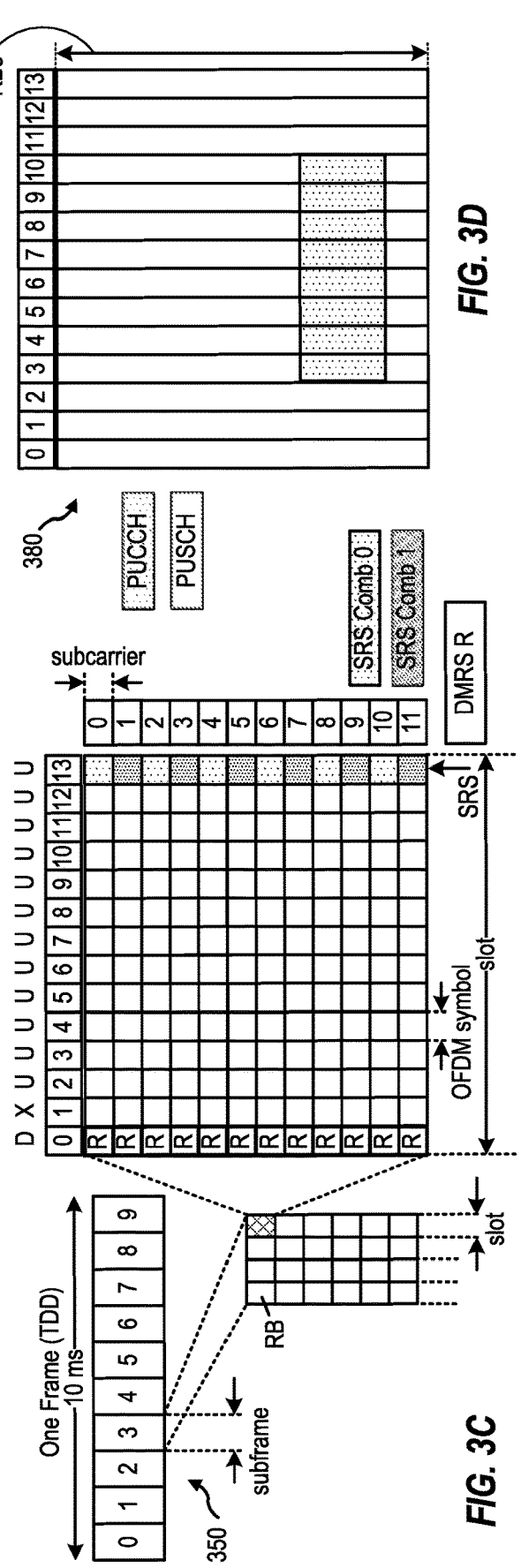

| | 0 (msb) | 1 | 2 | 3 | 4 | 5 | 6 | 7 (lsb) | # of bytes | Octet N | |
|---|---|---|---|---|---|---|---|---|---|---|---|
| | ef | extType = 0x03 | | | | | | | 1 | N | Header Info |
| | extLen[7:0] | | | | | | | | 1 | N+1 | |
| | numSymMask[2:0] | | | reserved | | | | | 1 | N+2 | |
| | num1MaskSets[1:0] | | sym1Mask[13:8] | | | | | | 1 | N+3 | |
| | sym1Mask[7:0] | | | | | | | | 1 | N+4 | |
| | ptrs1_1Mask[3:0] | | | | set1_1ReMask[11:8] | | | | 1 | N+5 | there is always a 1st set |
| | set1_1ReMask[7:0] | | | | | | | | 1 | N+6 | |
| | set1_1Csf | set1_1ModCompScaler[14:8] | | | | | | | 1 | N+7 | |
| | set1_1ModCompScaler[7:0] | | | | | | | | 1 | N+8 | |
| | ptrs1_2Mask[3:0] | | | | set1_2ReMask[11:8] | | | | 1 | N+9 | If there is a 2nd set |
| | set1_2ReMask[7:0] | | | | | | | | 1 | N+10 | |
| | set1_2Csf | set1_2ModCompScaler[14:8] | | | | | | | 1 | N+11 | |
| | set1_2ModCompScaler[7:0] | | | | | | | | 1 | N+12 | |
| | num2MaskSets[1:0] | | sym2Mask[13:8] | | | | | | 1 | N+h | If there is a 2nd symbol mask |
| | sym2Mask[7:0] | | | | | | | | 1 | N+h+1 | |
| | ptrs2_1Mask[3:0] | | | | set2_1ReMask[11:8] | | | | 1 | N+h+2 | |
| | set2_1ReMask[7:0] | | | | | | | | 1 | N+h+3 | |
| | set2_1Csf | set2_1ModCompScaler[14:8] | | | | | | | 1 | N+h+4 | |
| | set2_1ModCompScaler[7:0] | | | | | | | | 1 | N+h+5 | |
| | ptrs2_2Mask[3:0] | | | | set2_2ReMask[11:8] | | | | 1 | N+h+6 | If there is a 2nd set for the 2nd symbol mask |
| | set2_2ReMask[7:0] | | | | | | | | 1 | N+h+7 | |
| | set2_2Csf | set2_2ModCompScaler[14:8] | | | | | | | 1 | N+h+8 | |
| | set2_2ModCompScaler[7:0] | | | | | | | | 1 | N+h+9 | |
| | Pad to 4-byte boundary | | | | | | | | 1-3 | | |

FIG. 9

COMPACT DATA AND REFERENCE SIGNAL REPRESENTATION WITH MODULATION COMPRESSION

Aspects of the present disclosure relate to wireless communications, and more particularly, to techniques for efficiently signaling descriptions of both data and reference signals transmitted on a fronthaul interface using modulation compression.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a first network entity, comprising generating a message with entries that represent time and frequency resources for transmitting data and reference signals, wherein the data and reference signals are for transmission over a fronthaul interface using modulation compression, transmitting the message to a second network entity via the fronthaul interface, and data and reference signals, transmitted on the fronthaul interface using modulation compression, in accordance with the section.

One aspects provides a method for wireless communication by a second network entity, comprising receiving, from a first network entity, a message with entries that represent time and frequency resources for transmitting data and reference signals, wherein the data and reference signals are for transmission over a fronthaul interface using modulation compression and processing data and reference signals, transmitted on the fronthaul interface using modulation compression, in accordance with the section.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 3A, FIG. 3B, FIG. 3C, and FIG. 3D depict various example aspects of data structures for a wireless communication network.

FIG. 9 illustrates an example of an open Radio Access Network (O-RAN) section architecture section representation of data and reference signals, in accordance with certain aspects of the present disclosure.

DETAILED DESCRIPTION

Aspects of the present disclosure relate to wireless communications, and more particularly, to techniques for efficiently signaling descriptions of both data and reference signals transmitted on a fronthaul interface using modulation compression.

In the current deployment of 5G new radio (NR), distributed architectures that divide functionality are increasingly vital to support wide array of services (e.g., eMBB, URLLC, etc.) on a wireless network. While a standard Radio Access Network (RAN) architecture is capable of supporting diverse data rate and latency requirements of a 5G-NR service, an open-RAN (O-RAN) architecture presents an alternative to RAN architectures for 5G implementation.

Figure 4:
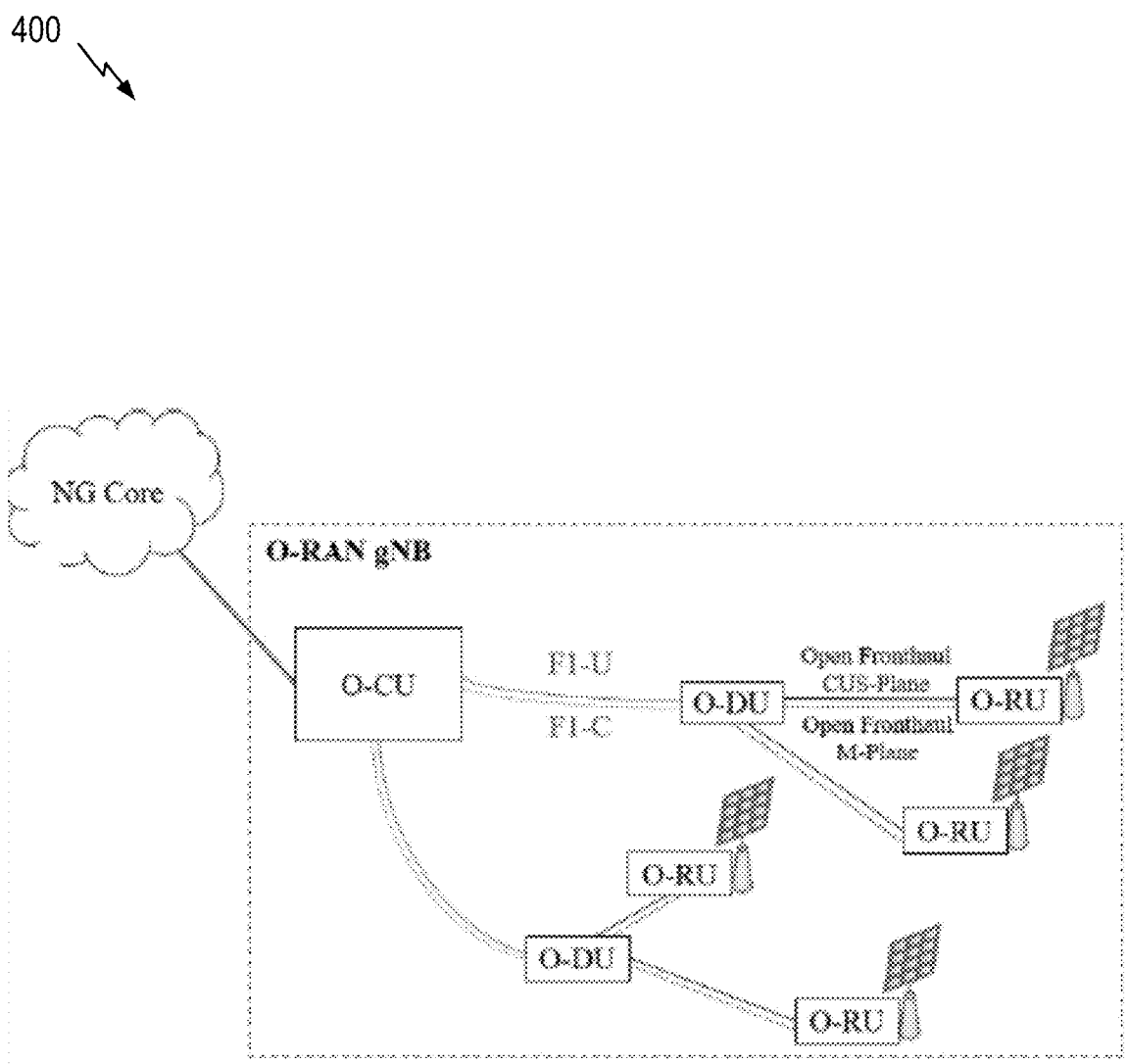
FIG. 4 illustrates an example open RAN (O-RAN) architecture, in which aspects of the present disclosure may be utilized.

An O-RAN architecture (as shown in FIG. 4) utilizes a functional split concept that defines a network entity comprising a Central Unit (CU) and one or more Distributed Units (DUs) connected through a midhaul interface. Each DU may connect to one or more Remote Units (RU) using a fronthaul interface. This architecture allows for greater network flexibility and modularity in addition to better support for data rate and latency requirements in 5G-NR.

Structures referred to as data sections identify portions of symbols and portions of resource blocks. The O-RAN control plane (C-plane) identifies these data sections and sends a message from the DU to the RU with the data section descriptions and how the RU will process them. The data itself is sent on the user plane (U-plane). A typical RB (shown below) reserves some tones for reference signals, such as channel state information reference signals (CSI-RS), demodulation reference signals (DMRS) and phase tracking reference signals (PTRS), some for control, and some for user data.

To better meet the requirements of 5G-NR, O-RAN reduces the open fronthaul traffic utilizing a mechanism referred to as modulation compression. This decreases the data rate on the fronthaul interface. In 5G-NR, certain reference signals, such as DMRS and PTRS, experience the same channel as data and, therefore, may share the beam weights.

Despite this, current ORAN C-Plane limitations require representing DMRS and PTRS in different sections than data when modulation compression is used with DL channels. In some cases, this section duplication can lead to beam weights duplications to avoid race conditions resulting from packet reordering. Thus, in addition to inefficient signaling of redundant information, data and reference signal section duplication may lead to ambiguity in what beam weights to apply.

Aspects of the present disclosure, however, may help address these issues by enabling a single section describing both reference signals and data, while still including distinct compression parameters for reference signals. A single section description may reduce the transmission load across the fronthaul by transmitting common information (e.g., beam weights shared between reference signals and data) only once.

Introduction to Wireless Communication Networks

Figure 1:
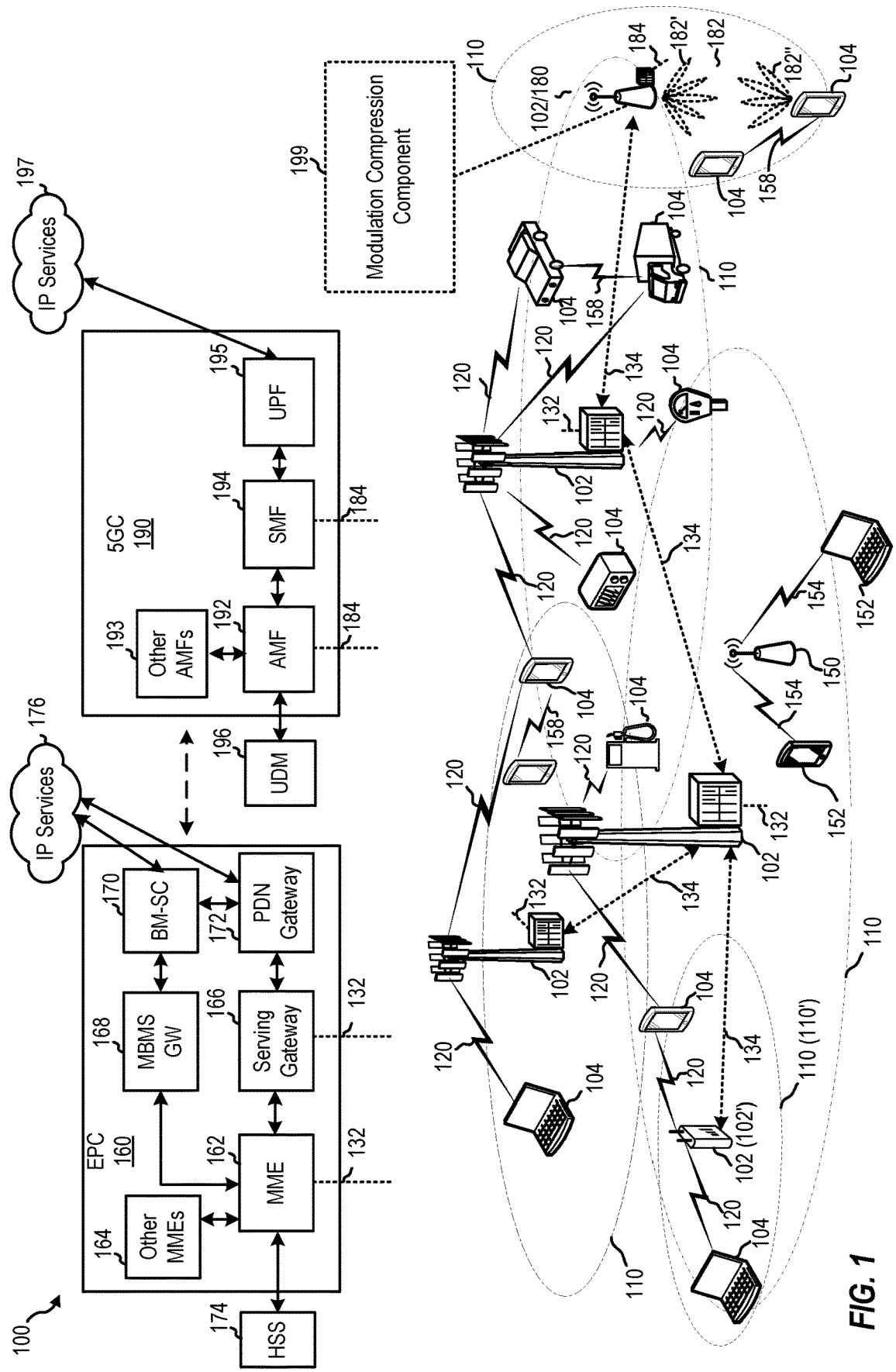
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes modulation compression component 199, which may be configured to transmit and/or receive data and reference signals over a fronthaul interface. For example, modulation compression component 199 may be implemented in a DU or RU of FIG. 4 and configured to perform operations described below with reference to FIGS. 10 and 11.

Figure 2:
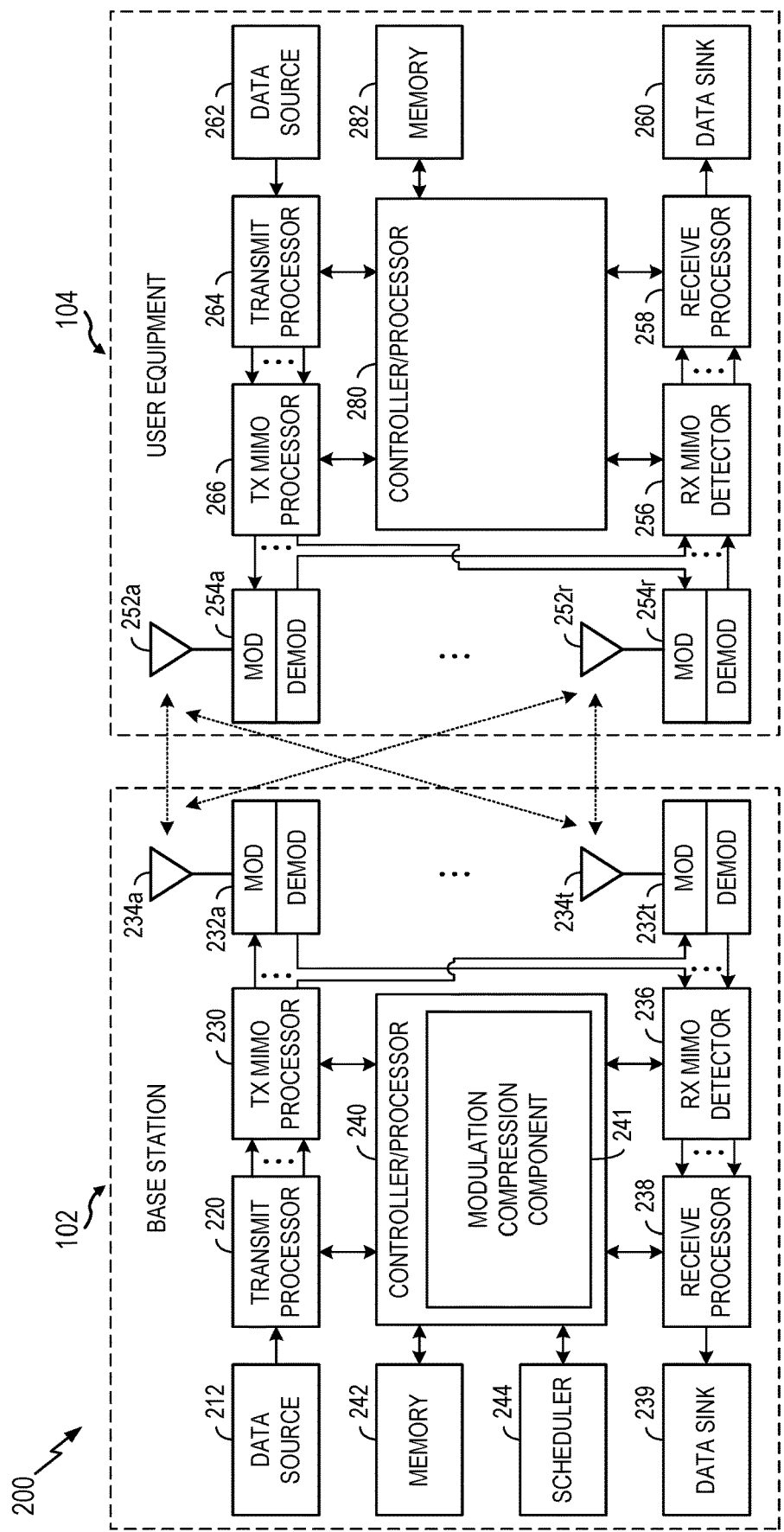
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes modulation compression component 241, which may be representative of modulation compression component 199 of FIG. 1. Notably, while depicted as an aspect of controller/processor 240, modulation compression component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Open-RAN Network Architecture

As noted above, in current deployments of 5G new radio (NR), efficient distributed architectures may be increasingly vital to support wide array of services (e.g., eMBB, URLLC, etc.) on a wireless network. Specific 5G-enabled services may require enhancements to increase data flow and reduce processing time for data transmitted in a 5G network. A network may implement required enhancements using, for example, a massive multiple input multiple output (MIMO) system. While a standard Radio Access Network (RAN) architecture is capable of supporting diverse data rate and latency requirements of a 5G-NR service, software-based and cloud-based network architectures may be an optimal alternative for RAN architectures where diverse 5G service requirements become demanding.

For example, the open-RAN (O-RAN) architecture shown in FIG. 4 presents one software-based alternative to RAN architectures for 5G implementation. As described above, an O-RAN architecture utilizes a functional split concept that defines a next generation node B (gNB) comprising a Central Unit (CU) and one or more Distributed Units (DUs) connected through a midhaul interface. Each DU may connect to one or more Radio Units (RUs) using a fronthaul interface. Baseband processing can be split between different entities, located at the CU, DU, and RU. This architecture allows for greater network flexibility and modularity in addition to better support for data rate and latency requirements.

One aspect of O-RAN architecture is a lower-level split (LLS) open fronthaul interface used to communicate between a DU and RU(s). The fronthaul interface is a frequency domain interface on a physical layer between a DU and various RUs. DU functions in O-RAN (e.g., radio link control (RLC), medium assess control (MAC), physical layer (PHY) high, etc.) are split between DUs and RUs. RU functions (e.g., PHY-low, radio frequency (RF), etc.), are hosted on the RU.

The Common Public Radio Interface (CPRI) classifies open front haul traffic into four message type: Control (C-plane), UserData (U-plane), Synchronization (S-plane), and management (M-plane). Each message is defined using resource blocks (RB). As noted above, data sections within each message identify portions of symbols and portions of resource blocks. The C-plane identifies these data sections and sends a message from the DU to the RU with the data section descriptions and how the RU will process them. C-plane messages are defined by transport headers, application headers, section headers, and extensions. The transport header defines a C-plane as a CPRI packet for a particular RU and stream. The application header describes the overall data region in terms of symbols and RBs. The data sections and extensions are described in section headers identified by the section ID. A data section describes a certain channel within a certain symbol or certain slot that may span multiple symbols. Sections that provide that channel also provide the beam identification. In addition, a section can also describe the compression parameters of a channel. The C-plane describes the section for both directions because the DU determines the RU's behavior for downlink and uplink. The data is sent on the U-plane. A RB may some resource elements (REs) for reference signals, control, and user data. Sections encompass information having similar transmission characteristics, so blocks of data may be sent in a single section representing a set of transmission characteristics.

Within an O-RAN data transmission, symbol mapping may require different sections for different transmission types. In the current state of the art, Symbol 3 does not have any reference signals, so a reference signal for a certain applied beamforming is defined in a different section. Data sections are sent from the DU to RU in order of symbols. Within a section, an RE mask describes which REs in a RB have a beamforming pattern to be applied. For example, if a section has a RE bitmap defined as 011011, then beamforming weight is applied on the REs 1, 2, 4, 5, etc., and REs 0, 3, 6, etc. are skipped. For reference signals, a mask of 100100 is used for cell reference/CSI-RS and a different beamforming is applied. In certain cases, O-RAN C-plane extensions may alter or define reference signal masks to reduce load on the open front haul.

To meet the wider carrier bandwidths, massive multiple input multiple output (MIMO) requirements, higher modulation orders, increased carrier requirements, and higher frequency ranges required in 5G new radio (NR) standards, Open Radio Access Network (O-RAN) utilizes five compression schemes (i.e., block floating point, block scaling, p-law, beam weight, and modulation compression) to limit the open fronthaul capacity requirement. Open fronthaul compression decreases the data rate across one or more RUs for all users based on open fronthaul capacity.

In certain cases, O-RAN extensions are enabled using modulation compression. Modulation compression is a lossless compression technique that operates over downlink (DL) user-plane modulated data symbols before being transmitted over the fronthaul interface. Each modulation compression encodes modulated data symbols into a determined number of symbols. The determined number of symbols, or bitwidth, is reduced in a modulation compression scheme. Typically, bitwidth prior to compression is equal to 32 bits. After modulation compression, bitwidth is reduced according to a maximum modulation order defined on an interface, which allows a reduction in capacity on the open fronthaul interface.

Modulation compression is achieved by shifting a constellation of modulation points to overlap and match with every symbol across all supported modulations in a fronthaul interface. In accordance with this shift, a single encoded constellation point may represent multiple symbols belonging to different modulations. A single constellation point may correspond to a certain bitwidth covering the modulation order necessary to represent the largest amount of data. In an O-RAN section, a constellation shift can be represented by a constellation shift value described in the section.

A certain bitwidth may also represent symbol values for arrays of constellation points that vary in size. In an O-RAN section, a scale factor can be represented by a modulation compression scalar value described in the section.

After receiving compressed data from a DU, an RU must reverse the shift of constellation points and apply a scale factor for the constellation modulation types represented in the block.

The control plane (C-plane) in an open Radio Access Network (O-RAN) describes the beam information of each channel. The C-plane describes the beams a channel is using by indicating beam identifiers (IDs), both in cases where beams may be stalled on an O-RAN remote unit, and where beam weights are transmitted alongside beam IDs. This allows beam refreshing on a remote unit.

Typically, different channels have different beams. For example, a physical downlink (DL) shared channel (PDSCH) may have a different beam set than a channel state resource reference signal (CSI-RS). However, in 5G new radio (5G-NR) reference signals within the same channel, like a demodulation reference signal (DMRS) and a phase tracking reference signal (PTRS) may use the same channel as the PDSCH data. Thus, reference signals for a PDSCH data transmission may share a beam set with the data. PDSCH may carry DMRS and PTRS alongside corresponding data using signaling that describes one transmission for both PDSCH and DMRS/PTRS on a given beam.

As noted above, in conventional O-RAN deployments, signaling between a distributed unit (DU) and a radio unit (RU) describes compression parameters from DMRS/PTRS differently than those described for data on the PDSCH. Specifically, the current O-RAN standard (e.g., Extension 5) uses section extensions to measure compression separate from PDSCH data. Thus, compression parameters for DMRS/PTRS are described separately from data channels that have the same beam weight in the current state of the art. This partitioning may lead to duplication of beam weights, doubling the throughput being used between the DU and the RU.

Extensions for compression describe the compression parameters of a channel. The extensions are in a section having multiple parts, and each part describes a different compression parameter. When modulation compression is used with downlink (DL) channels, C-plane limitations require representing DMRS and PTRS in different sections than data.

Figure 5:
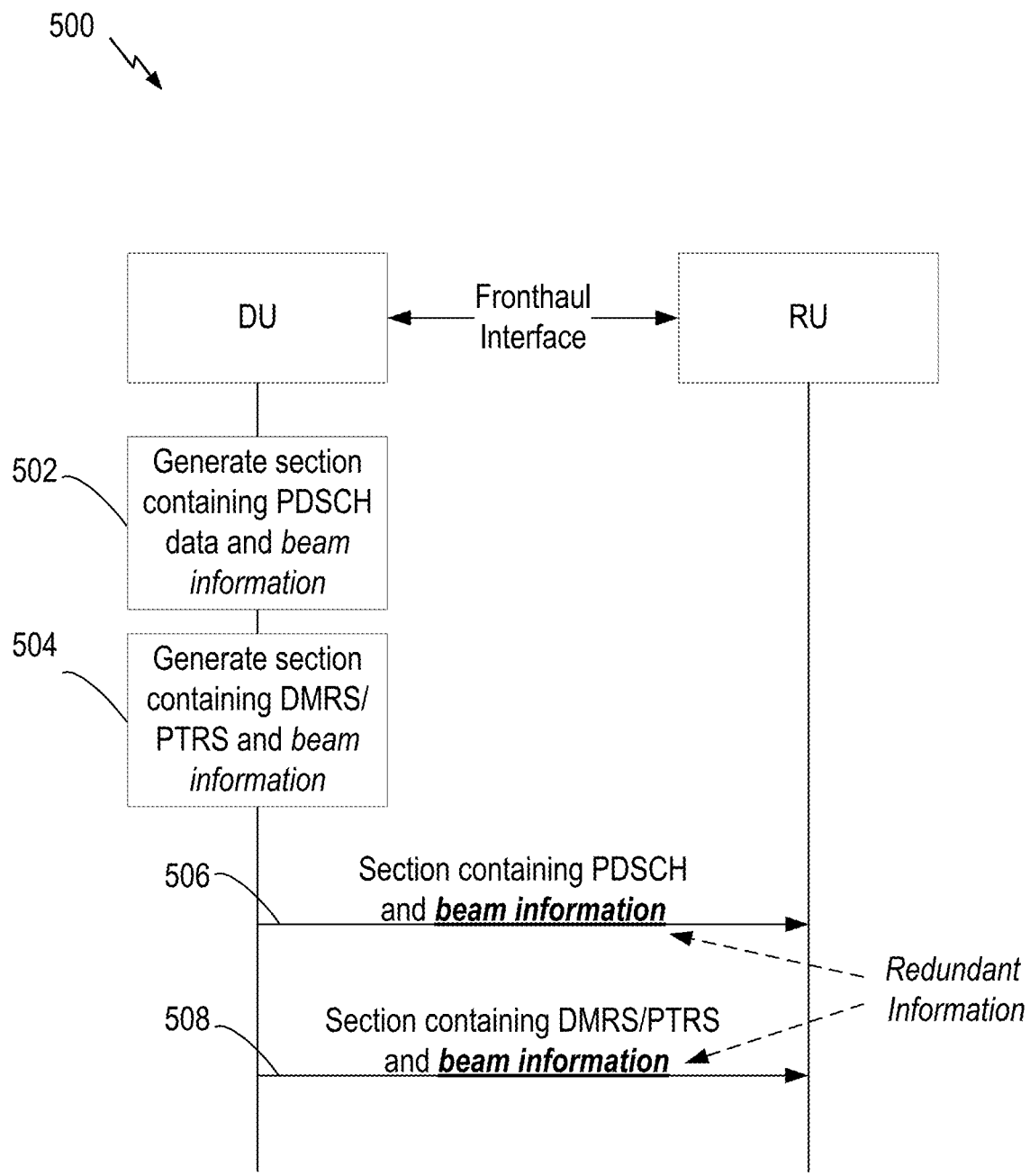
FIG. 5 is a call flow diagram depicting conventional signaling of data and reference signal representation for transmission over a fronthaul interface.

As illustrated in the call flow diagram 500 of FIG. 5, where a DU generates a PDSCH data section at 502 separate from a DMRS/PTRS section at 504, each section may contain the same beam information. The DU transmits the two sections to an RU separately on the fronthaul interface. Because the section transmitted at 506 contains the same beam information transmitted at 508, the second transmission is redundant and expensive, from a signaling overhead perspective.

Aspects Related to Communicating Data and Reference Signals in a Single Section

Aspects of the present disclosure, however, may help resolve this redundancy by enabling a message (e.g., a message with single section with a section extension) that describes both DMRS/PTRS and PDSCH data, while still including distinct compression parameters for reference signals. In other words, the signaling mechanisms proposed herein may reduce the amount of traffic sent across the fronthaul interface between a DU and RU to represent the format and content (in symbols/REs) of data and reference signals in an RB. While examples described herein involve messages that have defined (single) sections with bitmaps to convey various information describing data and reference signals sent using various bitmaps, the techniques presented herein could be implemented using any type of message efficiently conveying such information (e.g., whether using a defined section/section extension or not) using bitmaps or other structures (e.g., other suitable types of fields) to convey the information described herein.

Figure 6:
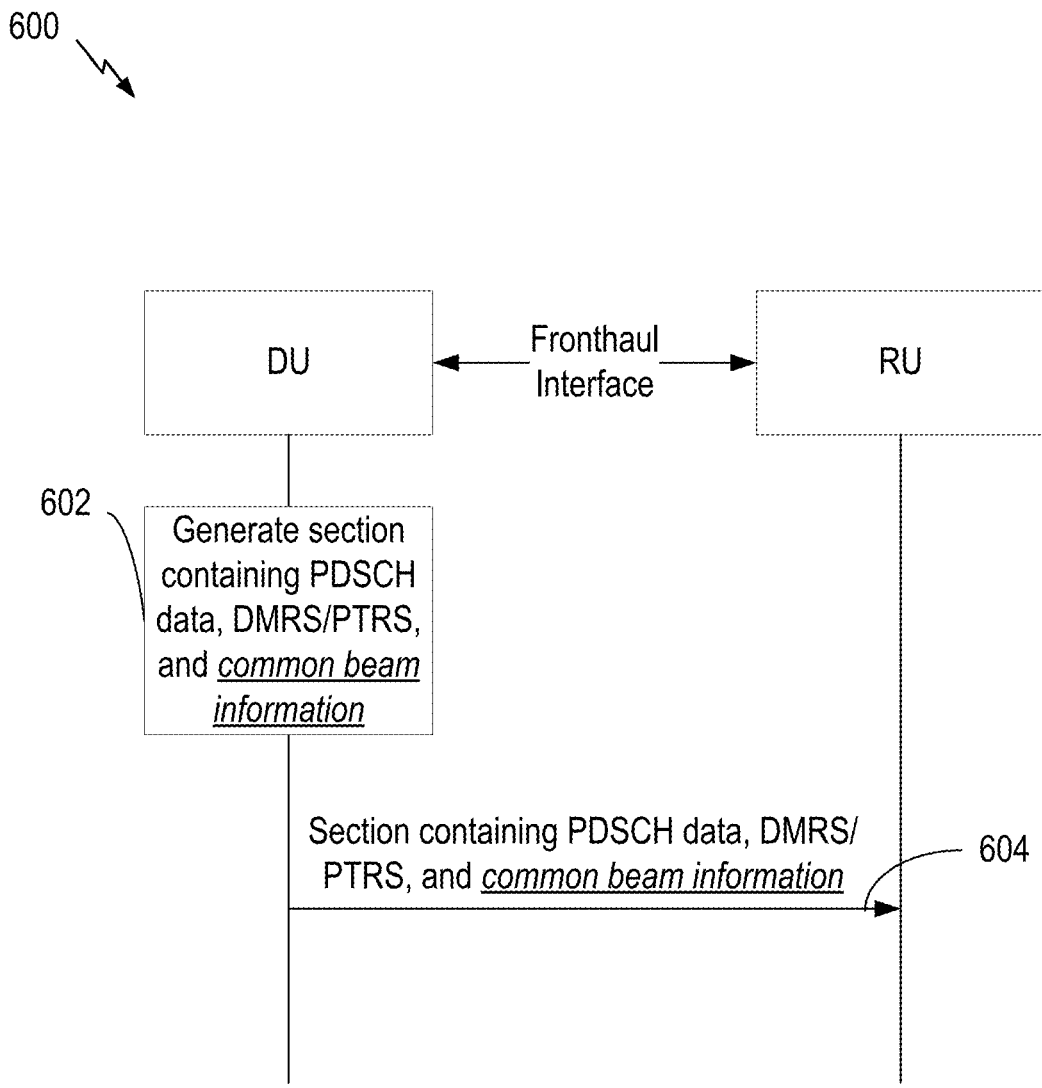
FIG. 6 is a call flow diagram depicting signaling of data and reference signal representation for transmission over a fronthaul interface, in accordance with certain aspects of the present disclosure.

As illustrated in the call flow diagram 600 of FIG. 6, a message (e.g., with a single section) with a description of both data and reference signals may reduce the transmission load across the fronthaul interface by half because beam information is only transmitted once. As shown, a single section generated, at 602, with common beam information, and representing both PDSCH data and DMRS/PTRS. By utilizing this single section, the DU may avoid the need to transmit separate sections containing identical beam information to an RU to describe reference signals. Thus, a single transmission at 504 is sufficient, significantly reducing singling overhead and fronthaul loading.

According to certain aspects, the section extension also optimizes PTRS representation so that it can be packed within a single section instead of up to 10 sections (as in the case in a currently defined Section Extension 6). The new extension is an improvement to O-RAN Section 5 Extension and adds symbols bitmaps and resource block (RB) periodicity information into each of its entries.

In a first case, a representation of demodulation reference signal (DMRS) transmitted with a physical downlink shared channel (PDSCH) data may be signaled using a single section. As will be described below, the section may include entries (with bitmaps) that indicates which symbols and which REs are allocated to data and/or reference signals. The single section and bitmaps may be described with reference to FIGS. 7A and 7B, which illustrate a 2 DMRS port example and a 1 DMRS port example, respectively.

As noted above, an O-RAN description for an RB including data and DMRS from two DMRS ports is represented in a control plane (C-plane) using two separate sections. In a conventional O-RAN C-plane representation, a first section describes data symbols 3-13, while a second section describes symbol 2 that contains DMRS.

Figure 7B:
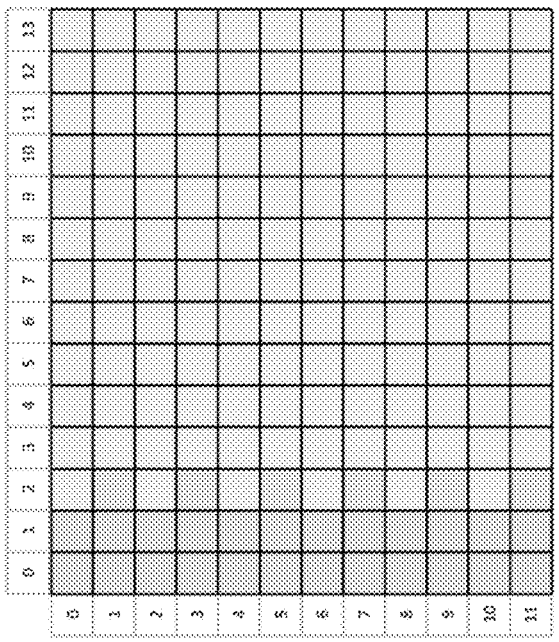
FIGS. 7A and 7B illustrate examples of data and reference signal resource allocation in a resource block that may be efficiently represented, in accordance with certain aspects of the present disclosure.

For the 1 port DMRS example of FIG. 7B, the first section may have an RE bitmap of all ones, indicating each RE (vertical axis) for symbols 3-13 (horizontal axis) is used for data. Because symbol 2 has both data and DMRS, however, the second section may have two entries, a first entry that has a bitmap (010101010101) that describes DMRS in every other (odd) RE and a second entry with a complementary bitmap (101010101010) that describes data in every other (even) RE. The use of these two sections, with two compression factors, results in redundancy between the symbol 2 PDSCH data and the symbols 3-13 PDSCH data.

According to certain aspects of the present disclosure, a single section, via a section extension (e.g., SE22), may have entries that describe data and DMRS on symbols and REs, avoiding redundancy noted above. The entries may include a combination of RE bitmaps and symbols bitmaps. Each entry indicates to a radio unit (RU) the type of information mapped on each RE and symbol indicated in the corresponding bitmaps.

Figure 7A:
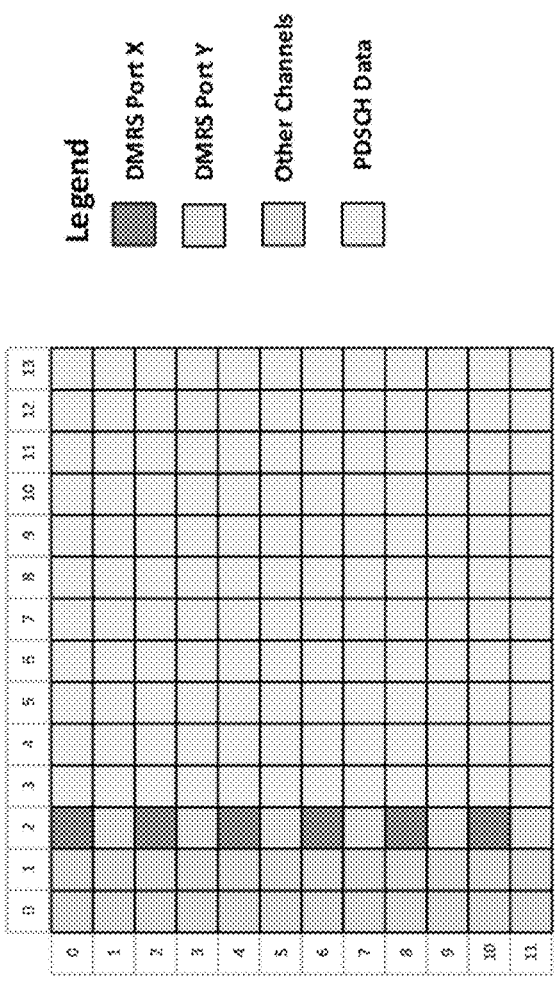

For example, for the two-port DMRS example of FIG. 7A, a first entry (e.g., SE22 entry #1) may have an RE bit map of all 1's to indicate each RE is used for data and a (14 bit) symbols bitmap (00011111111111) indicating symbols 3-13 are used for data. A second entry (e.g., SE22 entry #2) may have an RE bit map of all 1's and a (14 bit) symbols bitmap (00100000000000) indicating all REs of symbol 2 are used for DMRS.

For the single port DMRS example of FIG. 7B, the first entry (e.g., SE22 entry #1) for data may be the same as in the 2 port DMRS example of FIG. 7A. The second entry (e.g., SE22 entry #2) may have the same symbols bitmap as above (00100000000000) indicating symbol 2, but with an RE bit map (010101010101) indicating odd REs of symbol 2 are used for DMRS. A third entry (e.g., SE22 entry #3) may have the same symbols bitmap (00100000000000) indicating symbol 2, but with an RE bit map (101010101010) indicating even REs of symbol 2 are used for data.

In a similar manner, a representation of phase tracking reference signals (PTRS) transmitted with PDSCH data may also be signaled using a single section. As will be described below, the section may include entries (with bitmaps) that indicate not only which symbols and which REs are allocated to data and/or PTRS, but also resource block (RB) periodicity information for each entry using a 4-bits bitmap.

Figure 8:
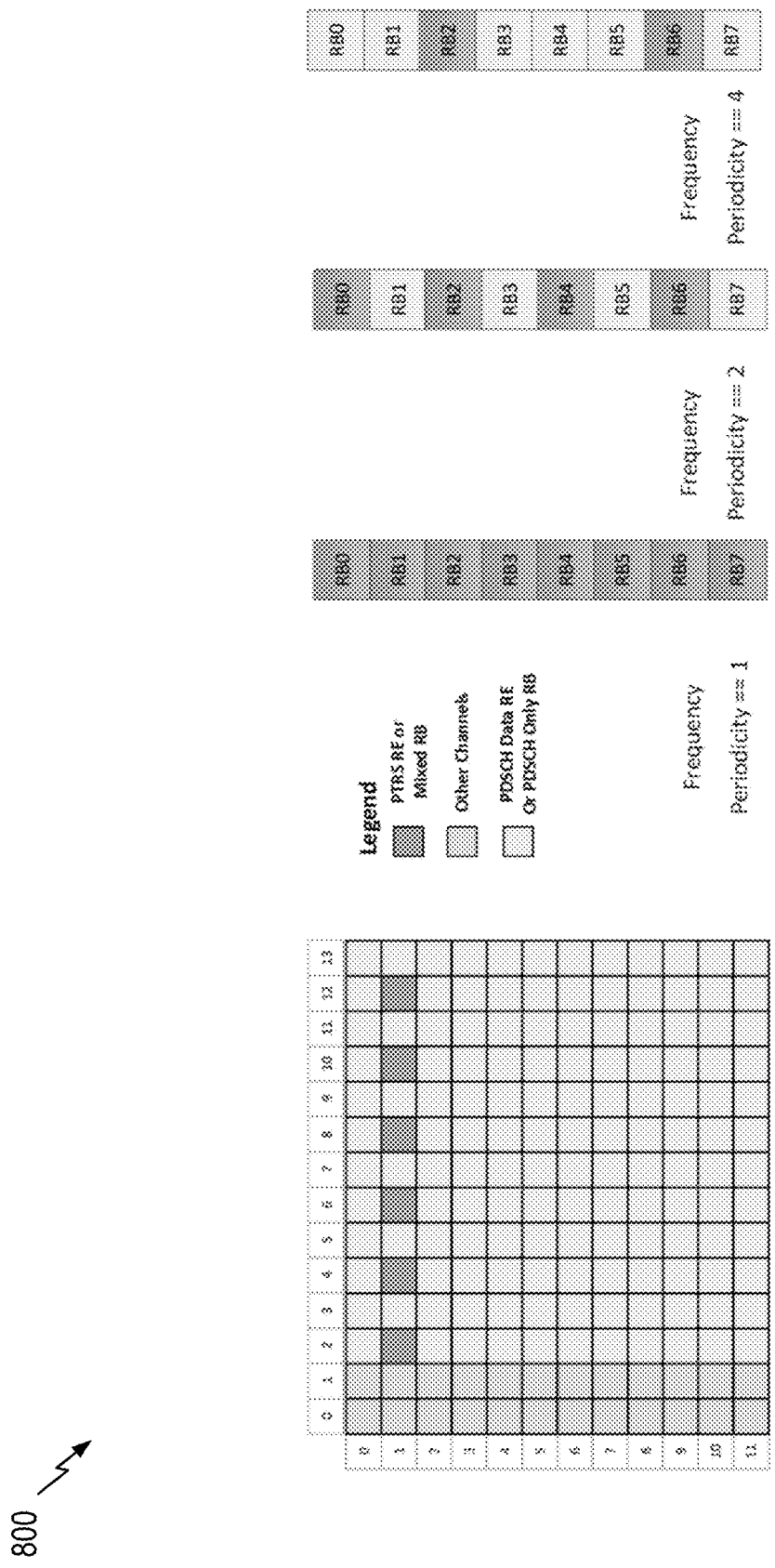
FIG. 8 illustrates examples of data and reference signal resource allocation in a resource block that may be efficiently represented, in accordance with certain aspects of the present disclosure.

As illustrated in FIG. 8, PTRS, like DMRS, may be transmitted in a single section with PDSCH data using a section that explicitly indicates which symbols each entry describes. The section will contain entries that describe the PDSCH data and PTRS using RS and symbol pattern within the section. Currently, though, PTRS may not be repeated in every RB. Rather, it may repeat in every other RB, or it may repeat once every 4 RBs. Thus, a section describing PTRS may use a bitmap indicating PTRS periodicity pattern in addition to bitmaps describing RE and symbol patterns. The descriptions below describe how a single section (section extension 22) may be used to represent PTRS and data for different PTRS periodicities.

For example, where PTRS periodicity is equal to one, PTRS is transmitted in every RB. In the example shown in FIG. 8, PTRS is sent only on RE1 in even symbols 2-12. For this example, a first entry (e.g., SE22 entry #1) may have an RE bit map of all 1's, a periodicity bitmap of all ones, and a symbols bitmap (00010101010101) indicating that, for each odd symbol 3-13, all REs are used for data. The periodicity bitmap of all 1s indicates this is repeated across each RBs.

A second entry (e.g., SE22 entry #2) may have an RE bit map of (01000000000) and a (14 bit) symbols bitmap (00101010101010) indicating that RE1 of even symbols 2-12 are used for PTRS, and an all ones periodicity.

Finally, a third entry (e.g., SE22 entry #3) may have an RE bit map of (10111111111) and a (14 bit) symbols bitmap (00101010101010) indicating that all REs other than RE1 of even symbols 2-12 are used for data, and an all ones periodicity.

Where PTRS periodicity is equal to two, PTRS is transmitted in every other RB (e.g., even RBs 0, 2, 4, and 6) as shown in FIG. 8. This change in periodicity may be captured by modifying certain entries and adding another data entry, as follows.

The first entry (e.g., SE22 entry #1), describing the data-only symbols (odd symbols 3-13) may be the same as the example above, with an RE bit map of all 1's, a periodicity bitmap of all ones, and a symbols bitmap (00010101010101) indicating that, for each odd symbol 3-13, all REs are used for data (in each RB).

The second entry (e.g., SE22 entry #2) may have the same RE bit map of (01000000000) and (14 bit) symbols bitmap (00101010101010) as in the example above, indicating that RE1 of even symbols 2-12 are used for PTRS, but with a periodicity bitmap of 1010, indicating this applies to every other RB (e.g., even RBs 0, 2, 4, and 6).

Similarly, the third entry (e.g., SE22 entry #3) may have the same RE bit map of (10111111111) and (14 bit) symbols bitmap (00101010101010) as in the example above, indicating that all REs other than RE1 of even symbols 2-12 are used for data, but also with a periodicity bitmap of 1010, indicating this applies to every other RB (e.g., even RBs 0, 2, 4, and 6).

Finally, a fourth entry (e.g., SE22 entry #4) may have an all ones RE bit map and a (14 bit) symbols bitmap (00101010101010) and a periodicity bitmap of 0101, indicating that all REs (including RE1) of even symbols 2-12 are used for data in odd RBs 1, 3, 4, and 7.

Where PTRS periodicity is equal to four, PTRS is transmitted in every fourth RB (e.g., even RBs 2 and 6) as shown in FIG. 8. This change in periodicity may be captured by modifying certain entries and adding another data entry, as follows.

The first entry (e.g., SE22 entry #1), describing the data-only symbols (odd symbols 3-13) may be the same as the examples above, with an RE bit map of all 1's, a periodicity bitmap of all ones, and a symbols bitmap (00010101010101) indicating that, for each odd symbol 3-13, all REs are used for data (in each RB).

The second entry (e.g., SE22 entry #2) may have the same RE bit map of (01000000000) and (14 bit) symbols bitmap (00101010101010) as in the examples above, indicating that RE1 of even symbols 2-12 are used for PTRS, but with a periodicity bitmap of 0010, indicating this applies to every other fourth RB (e.g., only RBs 2 and 6).

Similarly, the third entry (e.g., SE22 entry #3) may have the same RE bit map of (10111111111) and (14 bit) symbols bitmap (00101010101010) as in the examples above, indicating that all REs other than RE1 of even symbols 2-12 are used for data, but also with a periodicity bitmap of 0010, indicating this applies to every other fourth RB (e.g., only RBs 2 and 6).

Finally, the fourth entry (e.g., SE22 entry #4) may have an all ones RE bit map and a (14 bit) symbols bitmap (00101010101010) and a periodicity bitmap of 1101, indicating that all REs (including RE1) of even symbols 2-12 are used for data in all RBs except for every other fourth RB (e.g., except for RBs 2 and 6).

FIG. 9 illustrates an example structure definition for a section extension (SE) representing PDSCH data and reference signals as proposed herein. As illustrated, the structure may have header information, for example, indicating how many entries are included. In the example structure, a 3 bit field numSymMask may indicate a number (up to 8) of symbol masks (bitmaps) in the SE, while a 2 bit field num#MaskSets[1:0] may indicate a number (up to 4) of RE masks (reMasks) for a given symbol mask. A 4-bit periodicity field ptrs #.$Mask[3:0] represents a 4-bit mask (bitmap) showing PTRS repetition pattern. In some cases, this field may indicate a PTRS pattern from a defined set, such as {1111, 0001, 0010, 0100, 1000, 1110, 1101, 1011, 0111, 0101, 1010}. The RE bitmap may be indicated by indicated by a field set #IReMask[ 11:0] for symbol #. The field set #.$.Csf may indicate a (modulation compression parameter) constellation shift flag $ for symbol #. The field set #.$.ModCompScaler[14:0] may represent a scaler $ symbols #.

As described herein, aspects of the present disclosure provide a compact way to represent DMRS and PTRS channels information within an O-RAN CUS specification. The efficient representation techniques described herein may help reduce the complexity of ORAN transmitters and receivers and may also help reduce bandwidth requirements from the Fronthaul network used to connect O-DUs with O-RUs.

Example Methods

Figure 10:
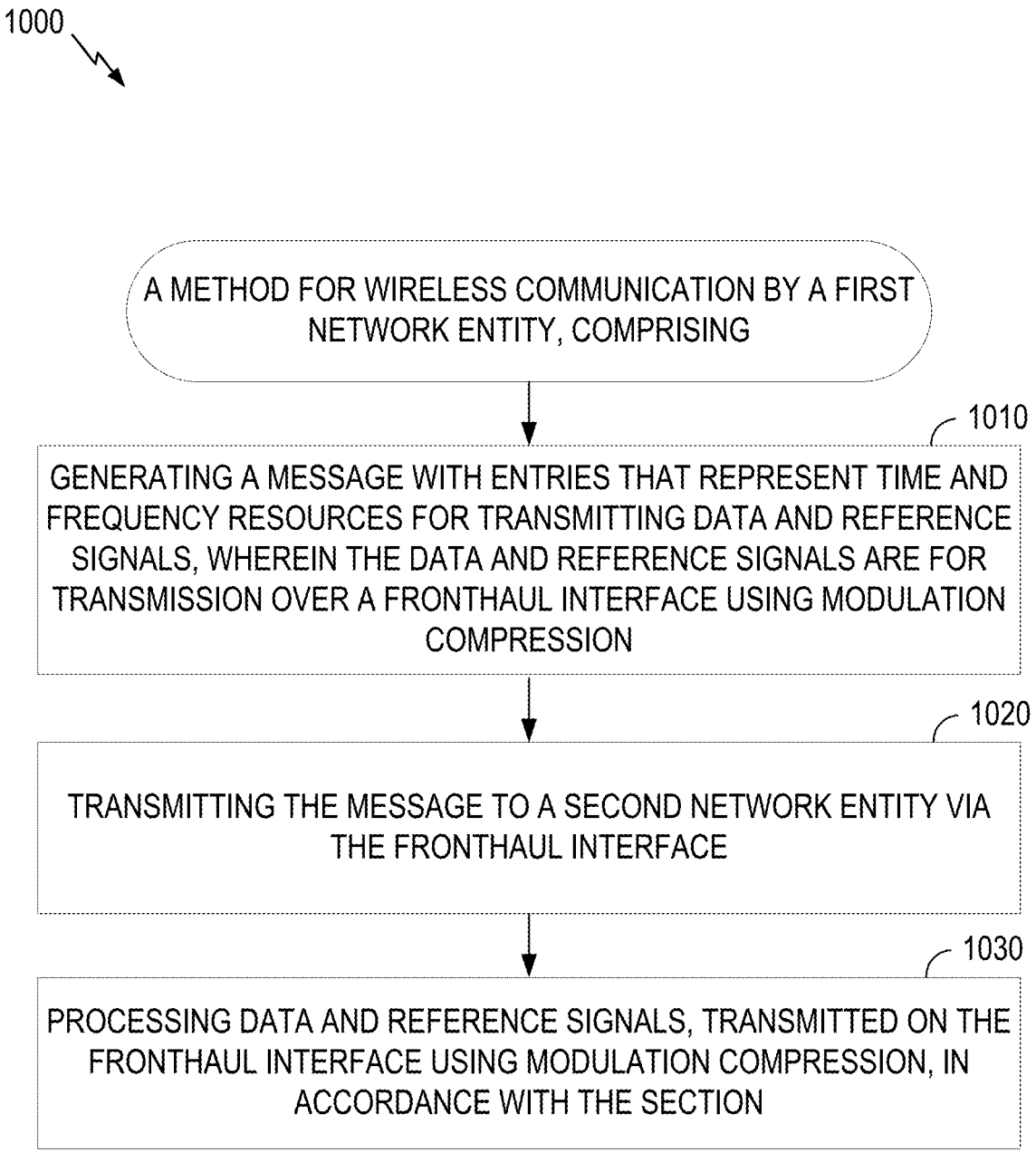
FIG. 10 illustrates example operations for wireless communications by a first network entity, in accordance with some aspects of the present disclosure.

FIG. 10 illustrates example operations for wireless communications by a first network entity (e.g., a DU), in accordance with some aspects of the present disclosure.

At 1010, the first network entity generates a message with entries that represent time and frequency resources for transmitting data and reference signals, wherein the data and reference signals are for transmission over a fronthaul interface using modulation compression.

At 1020, the first network entity transmits the message to a second network entity via the fronthaul interface.

At 1030, the first network entity processes data and reference signals, transmitted on the fronthaul interface using modulation compression, in accordance with the section.

Figure 11:
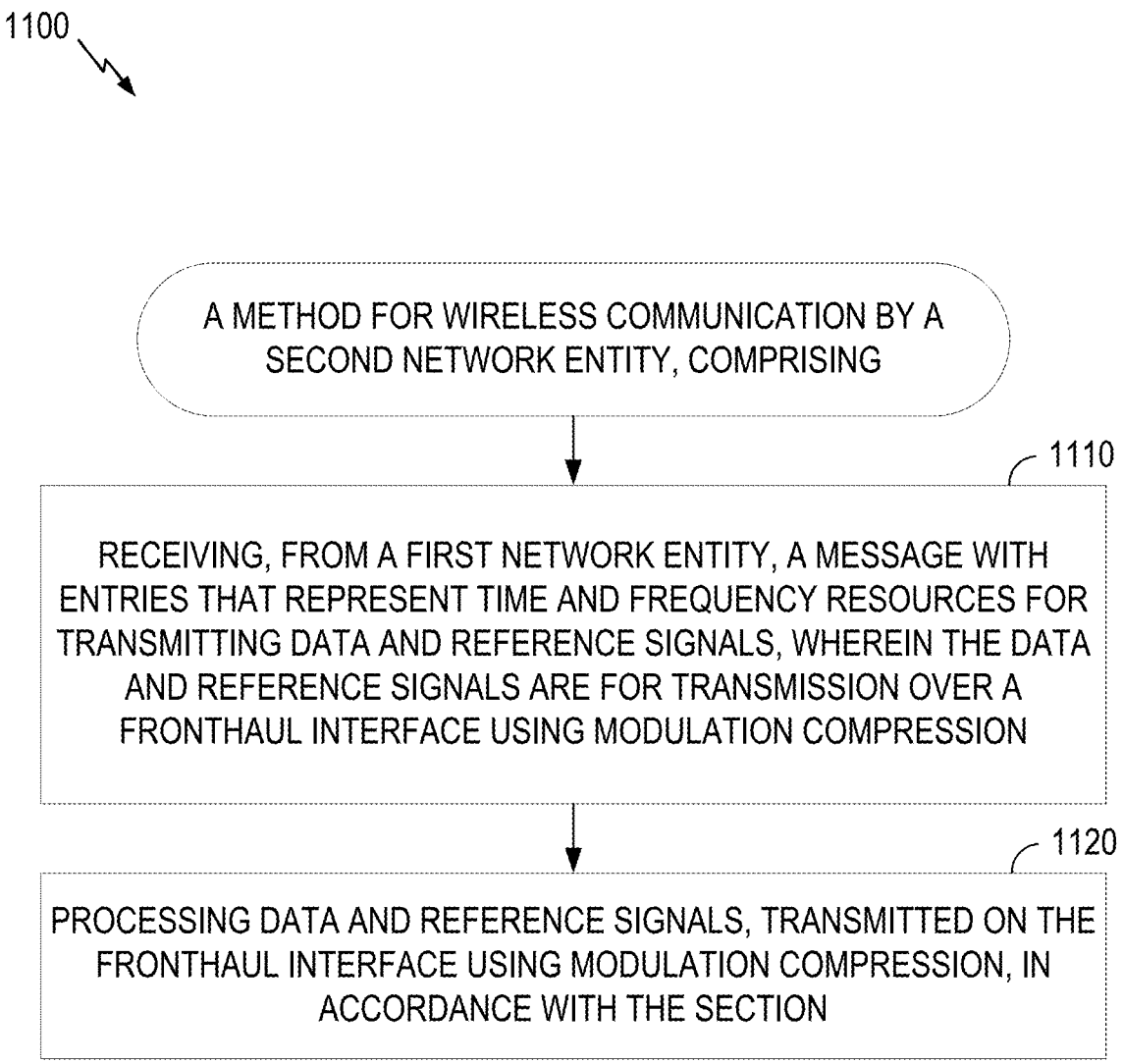
FIG. 11 illustrates example operations for wireless communications by a second network entity, in accordance with some aspects of the present disclosure.

FIG. 11 illustrates example operations for wireless communications by a second network entity (e.g., an RU), in accordance with some aspects of the present disclosure.

At 1110, the second network entity receives, from a first network entity, a message with entries that represent time and frequency resources for transmitting data and reference signals, wherein the data and reference signals are for transmission over a fronthaul interface using modulation compression.

At 1120, the second network entity processes data and reference signals, transmitted on the fronthaul interface using modulation compression, in accordance with the section.

Example Wireless Communication Devices

Figure 12:
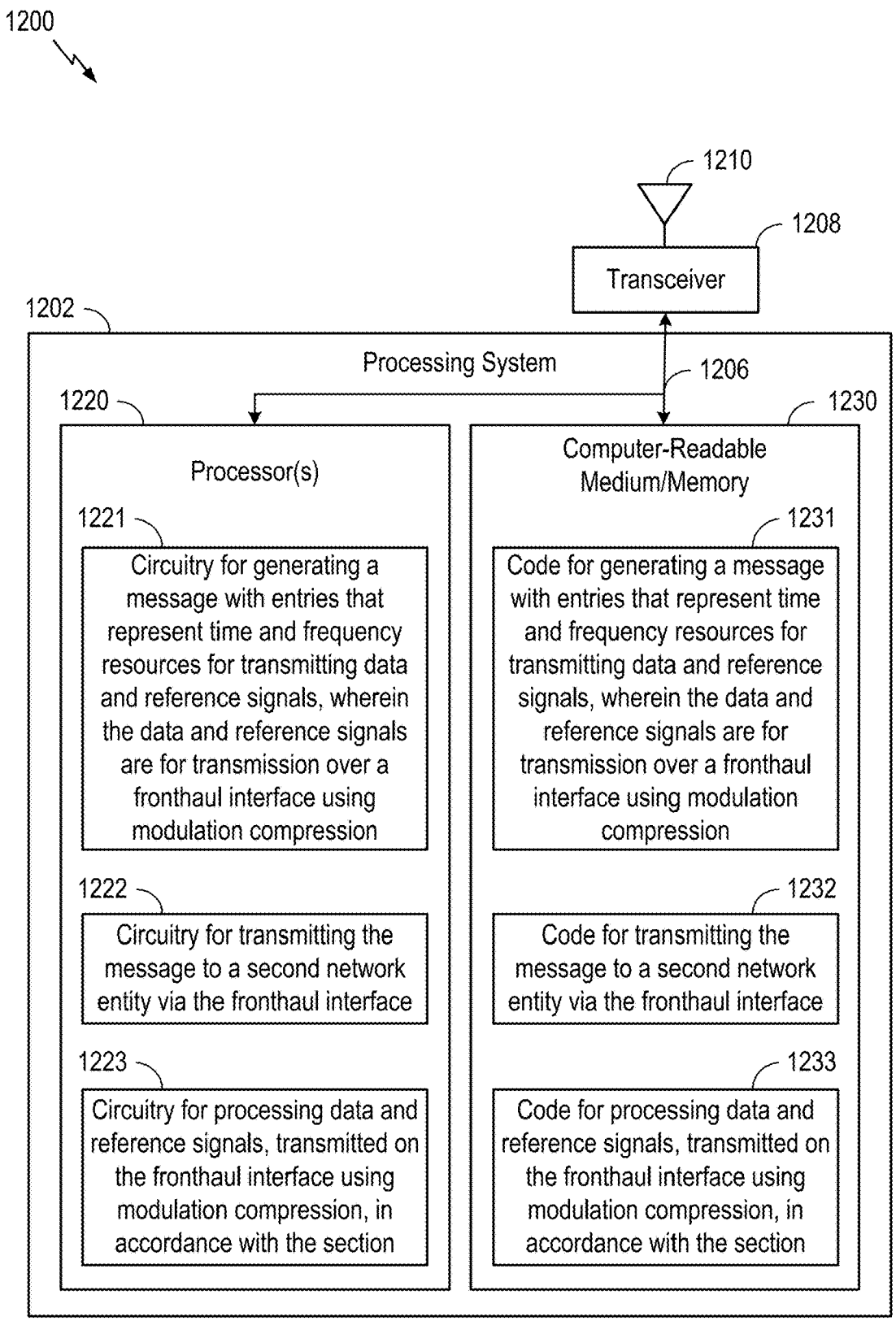
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 10 In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein.

In the depicted example, computer-readable medium/memory 1230 stores code 1231 for generating a message with entries that represent time and frequency resources for transmitting data and reference signals, wherein the data and reference signals are for transmission over a fronthaul interface using modulation compression, code 1232 for transmitting the message to a second network entity via the fronthaul interface, and code 1233 for processing data and reference signals, transmitted on the fronthaul interface using modulation compression, in accordance with the section.

In the depicted example, the one or more processors 1220 include circuitry configured to implement the code stored in the computer-readable medium/memory 1230, including circuitry 1221 for generating a message with entries that represent time and frequency resources for transmitting data and reference signals, wherein the data and reference signals are for transmission over a fronthaul interface using modulation compression, circuitry 1222 for transmitting the message to a second network entity via the fronthaul interface, and circuitry 1223 for processing data and reference signals, transmitted on the fronthaul interface using modulation compression, in accordance with the section.

Various components of communications device 1200 may provide means for performing the methods described herein, including with respect to FIG. 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for generating and transmitting may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including modulation compression component 241).

Notably, FIG. 12 is an example, and many other examples and configurations of communication device 1200 are possible.

Figure 13:
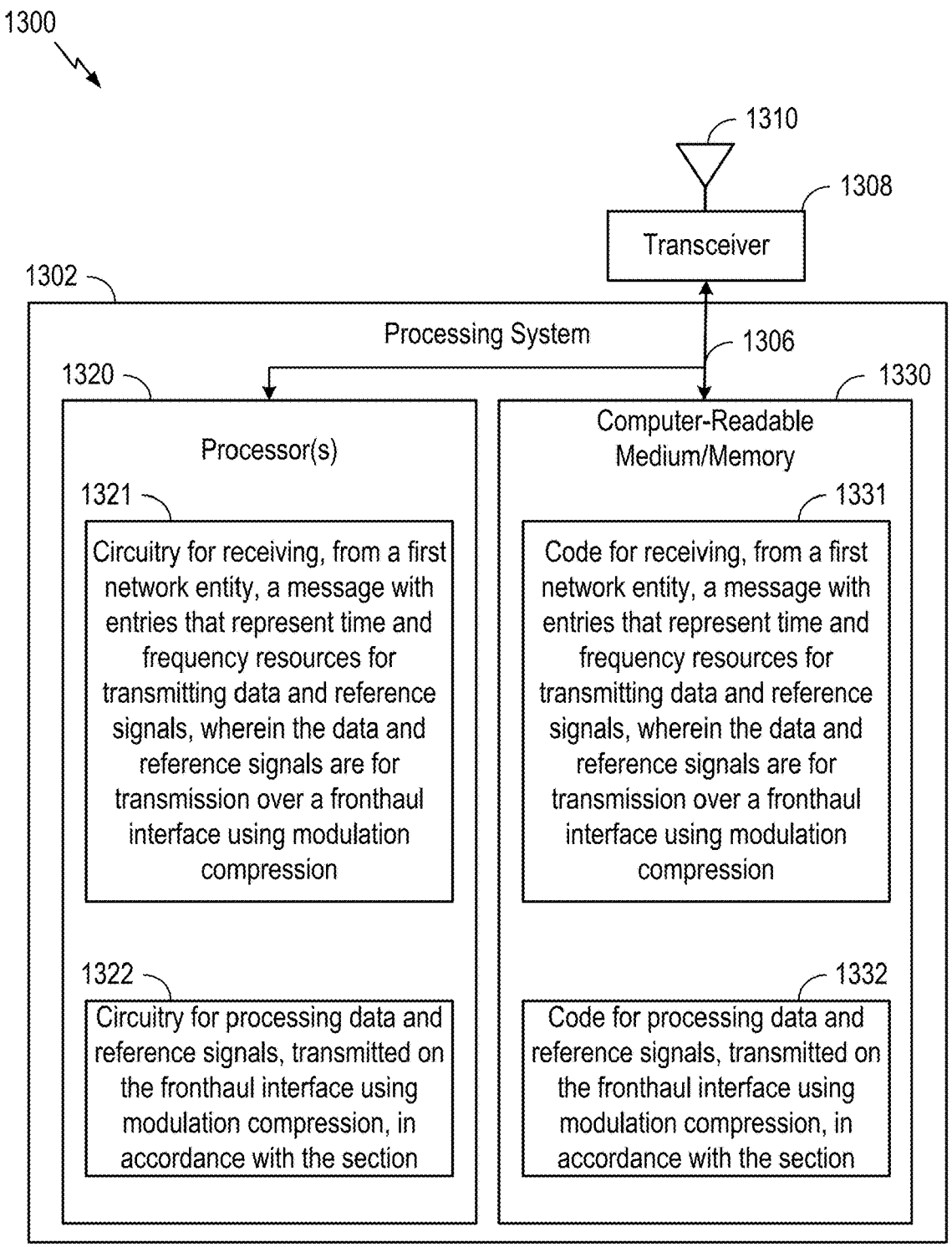
FIG. 13 depicts aspects of an example communications device.

FIG. 13 depicts an example communications device 1300 that includes various components operable, configured, or adapted to perform operations for the techniques disclosed herein, such as the operations depicted and described with respect to FIG. 11. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 11, or other operations for performing the various techniques discussed herein.

In the depicted example, computer-readable medium/memory 1330 stores code 1331 for receiving, from a first network entity, a message with entries that represent time and frequency resources for transmitting data and reference signals, wherein the data and reference signals are for transmission over a fronthaul interface using modulation compression, and code 1332 for processing data and reference signals, transmitted on the fronthaul interface using modulation compression, in accordance with the section.

In the depicted example, the one or more processors 1320 include circuitry configured to implement the code stored in the computer-readable medium/memory 1330, including circuitry 1321 for receiving, from a first network entity, a message with entries that represent time and frequency resources for transmitting data and reference signals, wherein the data and reference signals are for transmission over a fronthaul interface using modulation compression, and circuitry 1322 for processing data and reference signals, transmitted on the fronthaul interface using modulation compression, in accordance with the section.

Various components of communications device 1300 may provide means for performing the methods described herein, including with respect to FIG. 11.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving and processing may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including modulation compression component 241).

Notably, FIG. 13 is an example, and many other examples and configurations of communication device 1300 are possible.

Example Clauses

Implementation examples are described in the following numbered clauses:

Clause 1. A method for wireless communication by a first network entity, comprising: generating a message with entries that represent time and frequency resources for transmitting data and reference signals, wherein the data and reference signals are for transmission over a fronthaul interface using modulation compression, transmitting the message to a second network entity via the fronthaul interface, and processing data and reference signals, transmitted on the fronthaul interface using modulation compression, in accordance with the section.

Clause 2. The method of Clause 1, wherein the reference signals and data share common beam weights.

Clause 3. The method of any one of Clauses 1-2, wherein the reference signals comprise demodulation reference signals (DMRS).

Clause 4. The method of any one of Clauses 1-3, wherein the reference signals comprise phase tracking reference signals (PTRS).

Clause 5. The method of any one of Clauses 1-4, wherein the section has: at least a first entry with a first resource element (RE) bitmap that identifies resource elements (REs) of a resource block (RB) for transmitting data and a first symbols bitmap that identifies symbols of the RB for transmitting data; and at least a second entry with a second RE bitmap that identifies REs of the RB for transmitting reference signals and a second symbols bitmap that identifies symbols of the RB for transmitting reference signals.

Clause 6. The method of Clause 5, wherein, if both data and reference signals are transmitted in a same symbol of the RB, the section also has: at least a third entry with a third RE bitmap that identifies REs in the same symbols as the second entry for transmitting data.

Clause 7. The method of Clause 5, wherein each of the first entry and the second entry also includes: a bitmap indicating a periodicity with which the data or reference signals occur across RBs.

Clause 8. The method of Clause 5, wherein each of the first entry and the second entry also includes: a value indicating compressed modulation scaling factor for one or more symbols.

Clause 9. The method of Clause 5, wherein each of the first entry and the second entry also includes: a value indicating a constellation shift for one or more symbols.

Clause 10. A method for wireless communication by a second network entity, comprising: receiving, from a first network entity, a message with entries that represent time and frequency resources for transmitting data and reference signals, wherein the data and reference signals are for transmission over a fronthaul interface using modulation compression and processing data and reference signals, transmitted on the fronthaul interface using modulation compression, in accordance with the section.

Clause 11. The method of Clause 10, wherein the reference signals and data share common beam weights.

Clause 12. The method of any one of Clauses 10-11, wherein the reference signals comprise demodulation reference signals (DMRS).

Clause 13. The method of any one of Clauses 10-12, wherein the reference signals comprise phase tracking reference signals (PTRS).

Clause 14. The method of any one of Clauses 10-13, wherein the section has: at least a first entry with a first resource element (RE) bitmap that identifies resource elements (REs) of a resource block (RB) for transmitting data and a first symbols bitmap that identifies symbols of the RB for transmitting data; and at least a second entry with a second RE bitmap that identifies REs of the RB for transmitting reference signals and a second symbols bitmap that identifies symbols of the RB for transmitting reference signals.

Clause 15. The method of Clause 14, wherein, if both data and reference signals are transmitted in a same symbol of the RB, the section also has: at least a third entry with a third RE bitmap that identifies REs in the same symbols as the second entry for transmitting data.

Clause 16. The method of Clause 14, wherein each of the first entry and the second entry also includes: a bitmap indicating a periodicity with which the data or reference signals occur across RBs.

Clause 17. The method of Clause 14, wherein each of the first entry and the second entry also includes: a value indicating compressed modulation scaling factor for one or more symbols.

Clause 18. The method of Clause 14, wherein each of the first entry and the second entry also includes: a value indicating a constellation shift for one or more symbols.

Clause 19: An apparatus, comprising: a memory comprising executable instructions; one or more processors configured to execute the executable instructions and cause the apparatus to perform a method in accordance with any one of Clauses 1-18.

Clause 20: An apparatus, comprising means for performing a method in accordance with any one of Clauses 1-18.

Clause 21: A non-transitory computer-readable medium comprising executable instructions that, when executed by one or more processors of an apparatus, cause the apparatus to perform a method in accordance with any one of Clauses 1-18.

Clause 22: A computer program product embodied on a computer-readable storage medium comprising code for performing a method in accordance with any one of Clauses 1-18.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating both data and reference signals in a single section using modulation compression in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a first network entity, comprising:
    a memory; and
    a processor coupled with the memory, the processor and the memory configured to:
        generate a message with entries that represent time and frequency resources for transmitting data and reference signals, wherein the data and reference signals are for transmission over a fronthaul interface using modulation compression;
        transmit the message to a second network entity via the fronthaul interface; and
        process data and reference signals, transmitted on the fronthaul interface using the modulation compression, in accordance with the message.

2. The apparatus of claim 1, wherein the message has a section that includes the entries that represent time and frequency resources for transmitting data and reference signals.

3. The apparatus of claim 1, wherein processing the data and reference signals comprises at least one of:
    transmitting the data and reference signals in accordance with modulation compression parameters included in the message; or
    receiving the data and reference signals using modulation compression parameters included in the message.

4. The apparatus of claim 1, wherein the reference signals and data share common beam weights.

5. The apparatus of claim 1, wherein the reference signals comprise demodulation reference signals (DMRS).

6. The apparatus of claim 1, wherein the reference signals comprise phase tracking reference signals (PTRS).

7. The apparatus of claim 1, wherein the message has:
at least a first entry that identifies resource elements (REs) of a resource block (RB) for transmitting data and that identifies symbols of the RB for transmitting data; and
at least a second entry that identifies REs of the RB for transmitting reference signals and that identifies symbols of the RB for transmitting reference signals.

8. The apparatus of claim 7, wherein, if both data and reference signals are transmitted in a same symbol of the RB, the message also has:
at least a third entry that identifies REs in the same symbols as the second entry for transmitting data.

9. The apparatus of claim 7, wherein each of the first entry and the second entry also indicates:
a periodicity with which the data or reference signals occur across RBs.

10. The apparatus of claim 7, wherein each of the first entry and the second entry also indicates:
a compressed modulation scaling factor for one or more symbols.

11. The apparatus of claim 7, wherein each of the first entry and the second entry also includes:
a value indicating a constellation shift for one or more symbols.

12. A apparatus for wireless communication by a second network entity, comprising:
a memory; and
a processor coupled with the memory, the processor and the memory configured to:
receive, from a first network entity, a message having entries that represent time and frequency resources for transmitting data and reference signals, wherein the data and reference signals are for transmission over a fronthaul interface using modulation compression; and
process data and reference signals, transmitted on the fronthaul interface using the modulation compression, in accordance with the message.

13. The apparatus of claim 12, wherein the message has a section that includes the entries that represent time and frequency resources for transmitting data and reference signals.

14. The apparatus of claim 12, wherein processing the data and reference signals comprises at least one of:
transmitting the data and reference signals in accordance with modulation compression parameters included in the message; or
receiving the data and reference signals using modulation compression parameters included in the message.

15. The apparatus of claim 12, wherein the reference signals and data share common beam weights.

16. The apparatus of claim 12, wherein the reference signals comprise demodulation reference signals (DMRS).

17. The apparatus of claim 12, wherein the reference signals comprise phase tracking reference signals (PTRS).

18. The apparatus of claim 12, wherein the message has:
at least a first entry that identifies resource elements (REs) of a resource block (RB) for transmitting data and that identifies symbols of the RB for transmitting data; and
at least a second entry that identifies REs of the RB for transmitting reference signals and that identifies symbols of the RB for transmitting reference signals.

19. The apparatus of claim 18, wherein, if both data and reference signals are transmitted in a same symbol of the RB, the message also has:
at least a third entry that identifies REs in the same symbols as the second entry for transmitting data.

20. The apparatus of claim 18, wherein each of the first entry and the second entry also indicates:
a periodicity with which the data or reference signals occur across RBs.

21. The apparatus of claim 18, wherein each of the first entry and the second entry also indicates:
a compressed modulation scaling factor for one or more symbols.

22. The apparatus of claim 18, wherein each of the first entry and the second entry also includes:
a value indicating a constellation shift for one or more symbols.

23. A method for wireless communication by a first network entity, comprising:
generating a message with entries that represent time and frequency resources for transmitting data and reference signals, wherein the data and reference signals are for transmission over a fronthaul interface using modulation compression;
transmitting the message to a second network entity via the fronthaul interface; and
processing data and reference signals, transmitted on the fronthaul interface using the modulation compression, in accordance with the message.

24. The method of claim 23, wherein the message has a section that includes the entries that represent time and frequency resources for transmitting data and reference signals.

25. The method of claim 23, wherein processing the data and reference signals comprises at least one of:
transmitting the data and reference signals in accordance with modulation compression parameters included in the message; or
receiving the data and reference signals using modulation compression parameters included in the message.

26. The method of claim 23, wherein the reference signals and data share common beam weights.

27. The method of claim 23, wherein the message has:
at least a first entry that identifies resource elements (REs) of a resource block (RB) for transmitting data and that identifies symbols of the RB for transmitting data; and
at least a second entry that identifies REs of the RB for transmitting reference signals and that identifies symbols of the RB for transmitting reference signals.

28. The method of claim 27, wherein, if both data and reference signals are transmitted in a same symbol of the RB, the message also has:
at least a third entry that identifies REs in the same symbols as the second entry for transmitting data.

29. The method of claim 27, wherein each of the first entry and the second entry also indicates:
a periodicity with which the data or reference signals occur across RBs.

30. A method for wireless communication by a second network entity, comprising:
receiving, from a first network entity, a message with entries that represent time and frequency resources for transmitting data and reference signals, wherein the data and reference signals are for transmission over a fronthaul interface using modulation compression; and
processing data and reference signals, transmitted on the fronthaul interface using the modulation compression, in accordance with the message.

* * * * *